United States Patent
Jager (10) Patent No.: US 8,074,793 B2
(45) Date of Patent: Dec. 13, 2011

(54) BOLTLESS CONVEYOR ASSEMBLY

(75) Inventor: Todd Jager, Sioux City, IA (US)

(73) Assignee: Industrial Design Fabrication & Installation, Inc., Sioux City, IA (US)

( * ) Notice: Subject to any disclaimer, the term of this patent is extended or adjusted under 35 U.S.C. 154(b) by 674 days.

(21) Appl. No.: 12/163,237

(22) Filed: Jun. 27, 2008

(65) Prior Publication Data

US 2009/0000923 A1 Jan. 1, 2009

Related U.S. Application Data

(60) Provisional application No. 60/947,024, filed on Jun. 29, 2007.

(51) Int. Cl.
- *B65G 21/00* (2006.01)
- *B65G 37/00* (2006.01)
- *B65G 17/38* (2006.01)
- *B65G 17/06* (2006.01)
- *B65G 47/68* (2006.01)
- *B65G 49/00* (2006.01)
- *E04H 6/00* (2006.01)

(52) U.S. Cl. ............ 198/861.3; 198/851; 198/850; 198/853; 198/435; 198/465.1; 414/286

(58) Field of Classification Search ............ None
See application file for complete search history.

(56) References Cited

U.S. PATENT DOCUMENTS

| | | | |
|---|---|---|---|
| 3,848,732 A | 11/1974 | Catalano | |
| 3,985,070 A | 10/1976 | Longenecker et al. | |
| 4,015,517 A | 4/1977 | Pomara, Jr. | |
| 4,170,293 A | 10/1979 | Campbell | |
| 4,674,627 A | 6/1987 | Benlcio | |
| D325,277 S * | 4/1992 | Abbestam et al. | D34/35 |
| 5,205,400 A | 4/1993 | Breuss et al. | |
| 5,247,789 A * | 9/1993 | Abbestam et al. | 59/78 |
| 5,316,134 A | 5/1994 | Donohue | |
| 5,320,210 A * | 6/1994 | Van Den Bergh et al. | 198/465.1 |
| D370,759 S | 6/1996 | Kubsik et al. | |
| 5,924,550 A | 7/1999 | Karpinsky | |
| D423,749 S | 4/2000 | Musil et al. | |
| 6,099,882 A | 8/2000 | Risner, Jr. et al. | |
| 6,112,884 A | 9/2000 | Voorhees | |
| 6,196,097 B1 | 3/2001 | Handel | |
| 6,227,355 B1 | 5/2001 | White | |
| 6,371,283 B1 | 4/2002 | Manchester | |
| 6,427,831 B1 | 8/2002 | Norton | |
| D464,783 S | 10/2002 | Abbestam | |
| D486,289 S | 2/2004 | Abbestam | |
| 6,769,536 B2 | 8/2004 | Lutz | |
| 2004/0211652 A1 * | 10/2004 | Abbestam et al. | 198/860.1 |

FOREIGN PATENT DOCUMENTS

DE 3332190 3/1985

* cited by examiner

*Primary Examiner* — Gene Crawford
*Assistant Examiner* — Yolanda Cumbess
(74) *Attorney, Agent, or Firm* — Lathrop & Clark LLC (57) ABSTRACT

A conveyor system and method of assembling same in which parts are fastened without the use of welding, clamps, or threaded fasteners such as bolts and screws is provided. A bracket and slot mechanism is used to attach one conveyor component to another. The bracket and slot mechanism allows components to be easily attached/detached by merely applying force to slide the bracket into the slot. Moreover, when engaged, the bracket is held securely in the slot so that the components do not become detached during normal operation of the conveyor assembly.

18 Claims, 12 Drawing Sheets

BOLTLESS CONVEYOR ASSEMBLY

CROSS-REFERENCE TO RELATED APPLICATIONS

This application claims the benefit of related U.S. Provisional Patent Application Ser. No. 60/947,024, filed Jun. 29, 2007, the contents of which is hereby incorporated by reference in its entirety.

FIELD OF INVENTION

The assembly disclosed relates to the art of conveyor assemblies and systems generally, and more particularly to a conveyor systems and methods of assembling same in which parts are fastened without the use of welding, clamps, or threaded fasteners.

BACKGROUND

Conveyor assemblies have been used for some time in various industries as a means of distribution of materials in manufacturing and processing of different products, ranging from boxes, to pharmaceuticals, to food products, to toys and many other products. For instance, in the food industry, it is common for conveyors to be used for the transport of products, such as, but not limited to, produce, meats, and other dry goods between various processing stations within a food processing facility.

Many different conveyor systems are commercially available. For instance, conveyors may operate manually or through a power source. There are accumulating conveyors that allow for the collection of materials at a given point on the conveyor line; automated conveyors that perform conveying functions automatically; belt conveyors that utilize a belt to transport materials through the conveying system; chain conveyors that use parallel horizontal chains to move materials through a conveyor system; overhead conveyors that provide continuous movement of materials overhead; pallet conveyors that consist of portable platforms called pallets which move parts to different locations; roller conveyors that utilize round rotating parts called rollers to transport materials through the conveying system; and vertical conveyors that move materials up and down.

In order for the conveyor system to operate, there must be some way of connecting the various different components of the conveyor to one another and support the combined assembly when installed. Conventional conveyor systems use various different means for connecting components, including welding, bolts, screws, and clamps. However, these connection mechanisms do not allow for easy assembly/disassembly of the various components for cleaning; they provide cracks, corners, and surfaces where water, bacteria, mold, food waste, and unwanted materials can collect; they do not lend themselves to flexibility of design of the conveyor system; and they make it difficult to replace broken components.

Sanitation is a primary consideration in the food processing industry. Conveyors must be maintained in a clean and hygienic condition to meet basic sanitary standards. Cleaning of the conveyors is extremely costly as it requires a repeated outlay of money for soap, water, other chemicals, as well as downtime of the machines, and staff or cleaning crews to maintain a rigorous cleaning schedule. Much of the cost associated with maintaining clean, sanitary conveyors, is that conveyor systems have numerous cracks, corners, screw holes, flat surfaces and other crevices where water, bacteria, mold, food waste, and unwanted materials can collect. In order to reach these areas, conveyor assemblies typically require the disassembly of various components, and may in fact include areas that are difficult, if not impossible, to access. Where components in the conveyor system have been welded together, it is not possible to disassemble them for cleaning. In addition, where components have been connected through the use of a threaded connection, such as a screw or bolt, disassembly for cleaning requires the use of tools, significant staff time to disconnect components, and results in significant downtime of the machines.

In addition, the use of threaded fasteners or clamps provides many areas where water, bacteria, mold, food waste, and other unwanted materials can collect. For example, when a threaded bolt is used, the spaces in between the threads provide crevices where these types of materials can collect. Moreover, because of the shape and size of these crevices it is difficult to thoroughly clean them.

Furthermore, the use of welding and threaded fasteners require time and effort to assemble and disassemble the various components of the conveyor, and do not provide for flexibility in the design of the conveyor system. Conveyor applications vary greatly depending on the needs of each specific customer. For example, the length of the conveyor, the shape of the conveyor, and the points of incline of the conveyor may all vary from one application to another. In fact, a conveyor system is usually custom designed and fabricated for each particular application. When welding and threaded fasteners are used to join components together, even small changes in the conveyor system may necessitate a complete redesign and fabrication of a new conveyor.

Finally, the use of threaded means for connecting components makes replacing broken components difficult because the various screws and bolts connecting the components may not be of a standard size such that care must be taken to find pieces which will fit together properly.

Accordingly, what is needed in the art is a conveyor assembly which includes a means for connecting components which allows for easy assembly/disassembly for cleaning, contains a minimal surface area for the collection of water, bacteria, mold, food waste, and other unwanted materials, allows for adjusting components without the need to redesign and fabricate a new conveyor, and allows for providing standardized replacement components.

SUMMARY OF THE INVENTION

To this end, a conveyor assembly is disclosed in which at least some of the components are connected together using a means which does not comprise welding, clamps, or threaded type connectors such as screws and bolts. Specifically, the invention uses a bracket and slot type connection in which one of the components to be connected comprises a bracket and the other of the components to be connected comprises a slot such that the bracket engages with the slot in order to hold the two components together. More preferably, a conveyor assembly is provided comprising a first conveyor component having a slot for mating engagement with a bracket associated with a second conveyor component, wherein the second conveyor component is attached to said first conveyor component by engaging the bracket with the slot to achieve a snug fit.

BRIEF DESCRIPTION OF THE DRAWINGS

The invention will now be described, by way of example, with reference to the attached drawings, of which.

DETAILED DESCRIPTION OF PREFERRED EMBODIMENTS

As described, the present invention is embodied in a conveyor assembly. The conveyor assembly may comprise a frame made up of various support structures that provide the structural conveyor system support for the machinery that makes up the conveyor system, a bed upon which materials to be conveyed are placed, a belt that wraps around a conveyor pulley that transmits motion necessary for the movement of materials between two points, a drive and a drive pulley (when a power conveyor is used), one or more bearings, a control mechanism that controls movement, speed, and the direction of the conveyed materials, wear strips, return wheels and return shoes which help to guide the belt in its traverse around the conveyor bed and so forth. In addition, if the conveyor assembly includes a portion of the bed which is at an incline (e.g. in order to move products in a vertical direction), then the conveyor assembly may also include one or more hold down shoes which operate to keep the belt in close connection with the conveyor bed.

Figure 1:
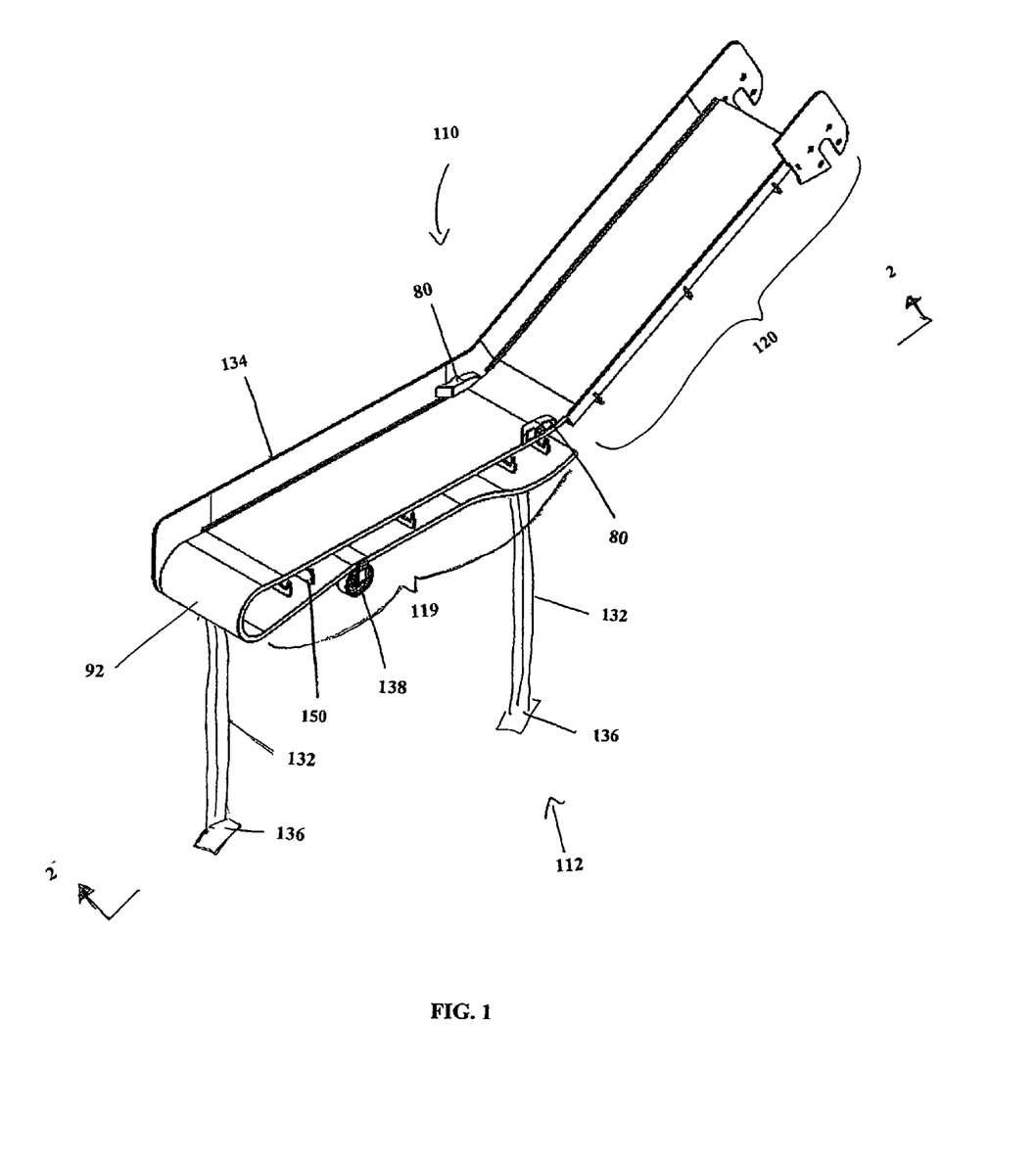
FIG. 1 is a cutaway perspective view of a conveyor assembly according to one embodiment of the boltless conveyor assembly, having a longitudinal rail removed from one side.
Figure 2:
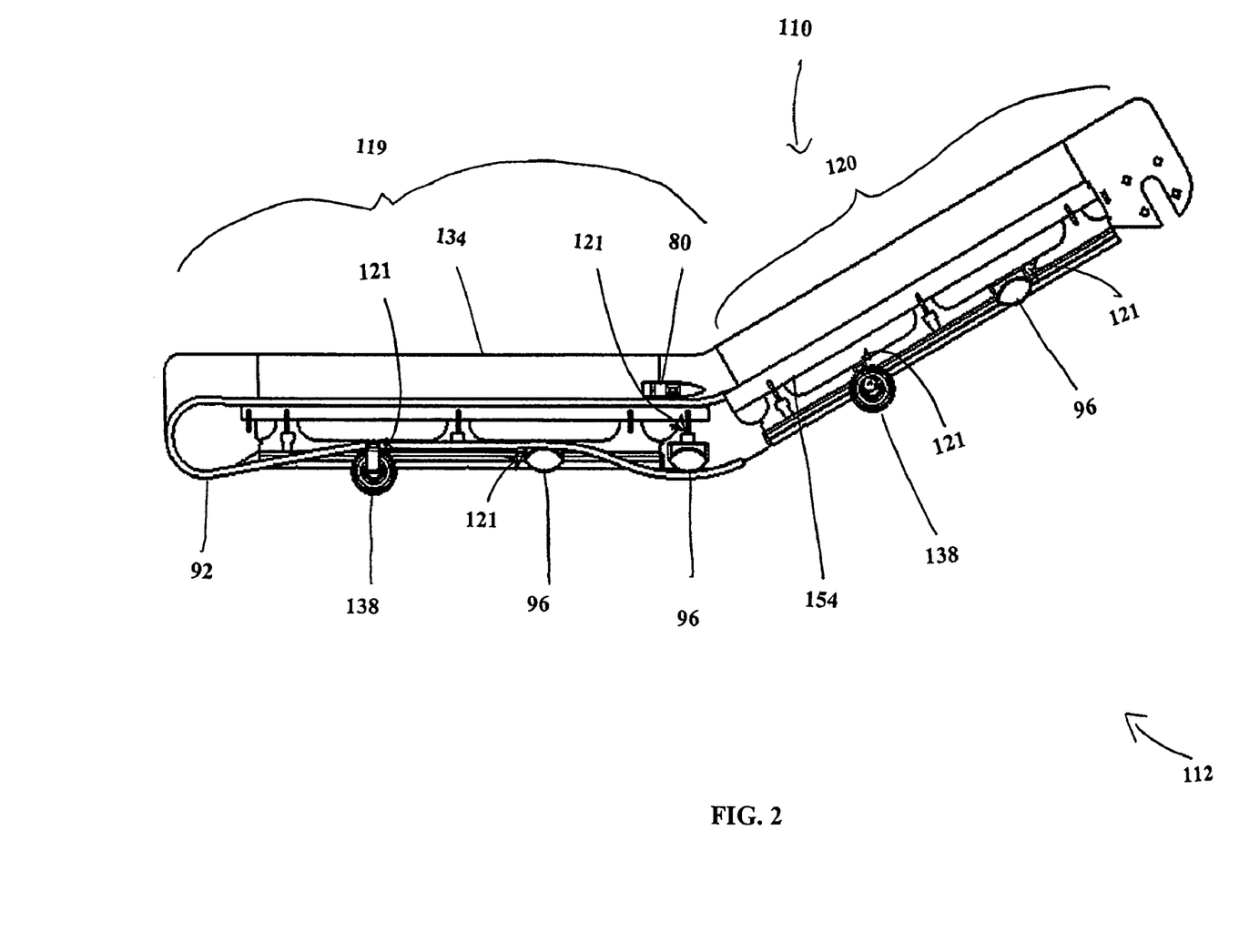
FIG. 2 is a side elevational view of the conveyor assembly of FIG. 1, taken along line 2-2 of FIG. 1, with conveyor supports removed.
Figure 3:
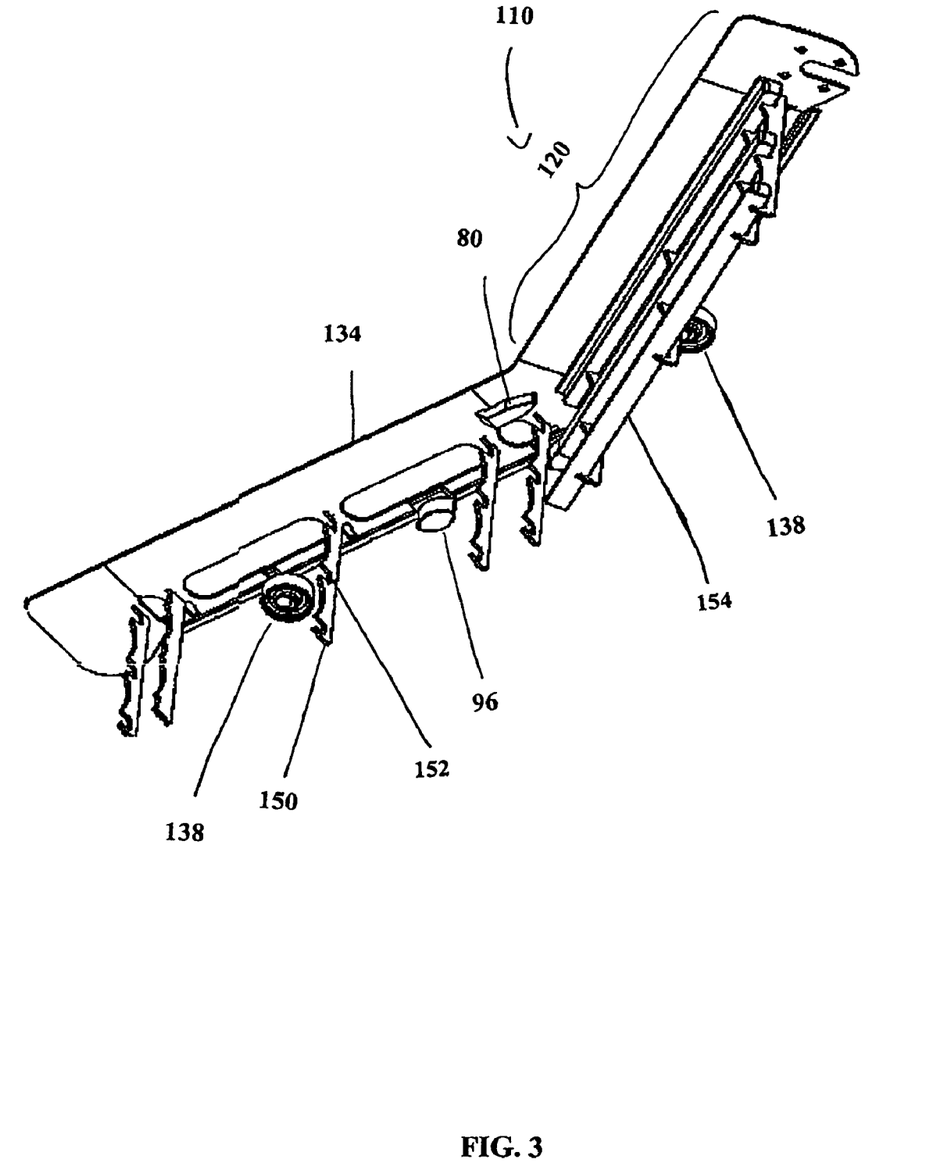
FIG. 3 is a cutaway perspective view of the conveyor assembly of FIG. 1, absent the conveyor supports and continuous belt.

As can be seen with reference to FIGS. 1-3, a conveyor assembly 110 of the present invention comprises an elongated conveyor frame 112. The conveyor frame 112 preferably includes a combination of one or more conveyor supports attached in various combinations. More specifically, the conveyor frame 112 includes longitudinal rails 134 which act to guide a continuous conveyor belt 92 as it moves along the frame and serves to retain product carried by the belt on the conveyor. In the preferred embodiment, there are two such longitudinal rails 134 placed opposite one another, and spaced a distance apart such that the continuous conveyor belt 92 will run in between the two rails. It is noted that one of the longitudinal rails 134 has been removed from FIGS. 1-3 in order to show the various conveyor components that lie between the rails. These longitudinal rails 134 are attached near the upper end of vertical supports 132 (shown in FIG. 1). In a free-standing embodiment of the assembly 110, a plurality of vertical supports 132 may be attached to one or more longitudinal rails 134. Alternative forms of support, such as attachment of one side of the conveyor assembly to a wall, are also contemplated. In addition, vertically adjustable feet 136 may be positioned at the lower end of vertical supports 132. Ideally, the vertically adjustable feet 136 are attached to the lower end of the vertical supports 132 in a manner that allows for the individual adjustment of the height of each of the various vertical supports 132.

As can best be seen in FIG. 3, various conveyor components may be attached to the longitudinal rail 134. One or more cross members 150 are attached to the longitudinal rail 134. These cross members 150 preferably comprise one or more grooves 152 for receiving a wear strip 154. In a preferred embodiment, a series of cross members 150 are provided spaced apart along the longitudinal direction of the conveyor assembly 110. The grooves 152 of each cross member 150 are positioned in a parallel relation so that a wear strip 154 of a length greater than or equal to the distance between two or more cross members 150 may be supported thereon. Preferably, a plurality of grooves 152 are provided in a spaced apart manner along the length of the cross member 150. As a result, a plurality of wear strips 154 are supported in parallel relation, running in a longitudinal direction along the length of the conveyor assembly 110. The belt 92 will ride on top of the wear strips 154 as it traverses the frame. An exemplary embodiment of a conveyor assembly having wear strips as described is illustrated in U.S. patent application Ser. No. 11/194,378, which is incorporated herein by reference in its entirety.

As one of ordinary skill in the art would understand, a conveyor frame may include various other conveyor support structures without departing from the overall scope of the present invention. Moreover, it is to be understood that the unique features of the invention discussed herein may be applied to conventional conveyor systems known in the art and, apart from the exemplary components discussed herein for purposes of illustration of the preferred embodiment, individual conveyor components will not be discussed in further detail.

The conveyor assembly 110 of the preferred embodiment uses a bracket and slot mechanism 121 for the attachment of components. In order to illustrate the bracket and slot mechanism, as shown in the Figures, the mechanism 121 will be described with respect to three exemplary components, a return wheel 138, a return shoe 96, and a hold down shoe 80. However, the bracket and slot mechanism 121 may be equally applied to any component of the conveyor assembly and more preferably, to components which are frequently removed, reattached, or replaced.

Figures 4, 4A:
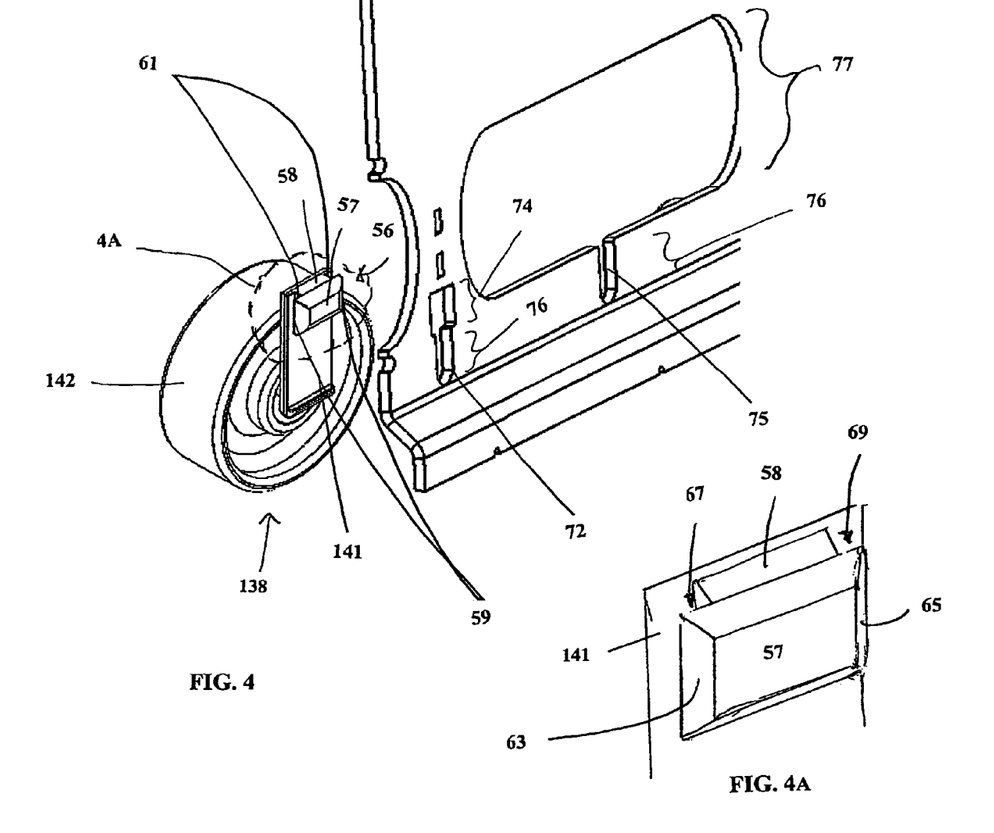
FIG. 4 is a cutaway exploded perspective view of one embodiment of the boltless conveyor assembly, showing the bracket and slot mechanism associated with a return wheel conveyor component and longitudinal rail.
FIG. 4A is a perspective view of the bracket of FIG. 4, taken at line 4A of FIG. 4.

In order to attach a device, as shown in FIGS. 4-18, such as a return wheel 138, return shoe 96, or hold down shoe 80, to the longitudinal rail 134, a bracket 56 is provided on such a component (see FIG. 4). The bracket 56 is capable of sliding into a slot 72 provided on the longitudinal rail 134 to achieve a snug fit. Each bracket of one preferred embodiment comprises a head portion 57 and a neck portion 58. Thus, bracket 56 may include a first portion or head portion 57 spaced from a spacer 141, which serves to attach the relevant component, or the relevant conveyor component by a second portion or neck portion 58. The head portion 57 has a width 59 which is greater than the width 61 of the second portion or neck 58. As a result, a pair of flanges 63, 65 are formed by the first portion 57, or grooves 67, 69, between the spacer 141 and the head portion 57 (FIG. 4A). The bracket 56 may be formed integrally with spacer 141 by molding, laser cut, die cut or similar methods, or may be adhesively attached or attached using fasteners. The bracket and/or attached spacer 141 and/or component attached to spacer 141 may be made from plastic, composite, metal and/or other materials of suitable strength.

As can be seen in FIGS. 4-7 the longitudinal rail 134 comprises at least one slot 72. Corresponding slots 72 are provided on the longitudinal rail 134. Each slot comprises a first slot portion 74 and a second slot portion 76. The first slot portion 74 has a first limiting surface 175, and a pair of sidewalls 177, 179 separating the first limiting surface from a second limiting surface 181 (FIG. 5A). In the preferred embodiment, the second limiting surface 181 is a pair of shoulders 183, 185 separated by the second slot portion 76. The second slot portion 76 is open to the first slot portion 74 and includes a pair of sidewalls 187, 189, extending to the third limiting surface 191. In one preferred embodiment, the first and second slot portions 74, 76 form a T-shaped aperture. Alternative shapes and dimensions, however, would not depart from the overall scope of the present invention. The slot 72 is preferably formed by laser cut, die punch or similar method from the longitudinal rail. Preferably, the method chosen forms a consistent and reproducible slot. The first slot portion 74 is preferably wider than the second slot portion 76. In addition, the first slot portion 74 is wider than the bracket 56 or a portion thereof so that at least a portion of the bracket can be inserted through the first slot portion 74. The bracket is capable of insertion into the first slot portion 74, can be slid or positioned in the second slot portion 76, but cannot be removed directly from the second slot portion 76. The width of the second slot portion 76 is approximately equivalent to, or slightly smaller than, the width of the neck portion 58 of the bracket 56 such that the neck portion 58 of the bracket is held snugly in place after being inserted into the second slot portion 76. In addition, the second slot portion 76 of the slot 72 is not as wide as the head portion 57 of the bracket 56. Any width would be acceptable for the first slot portion and second slot portion for the purposes provided.

Figure 6:
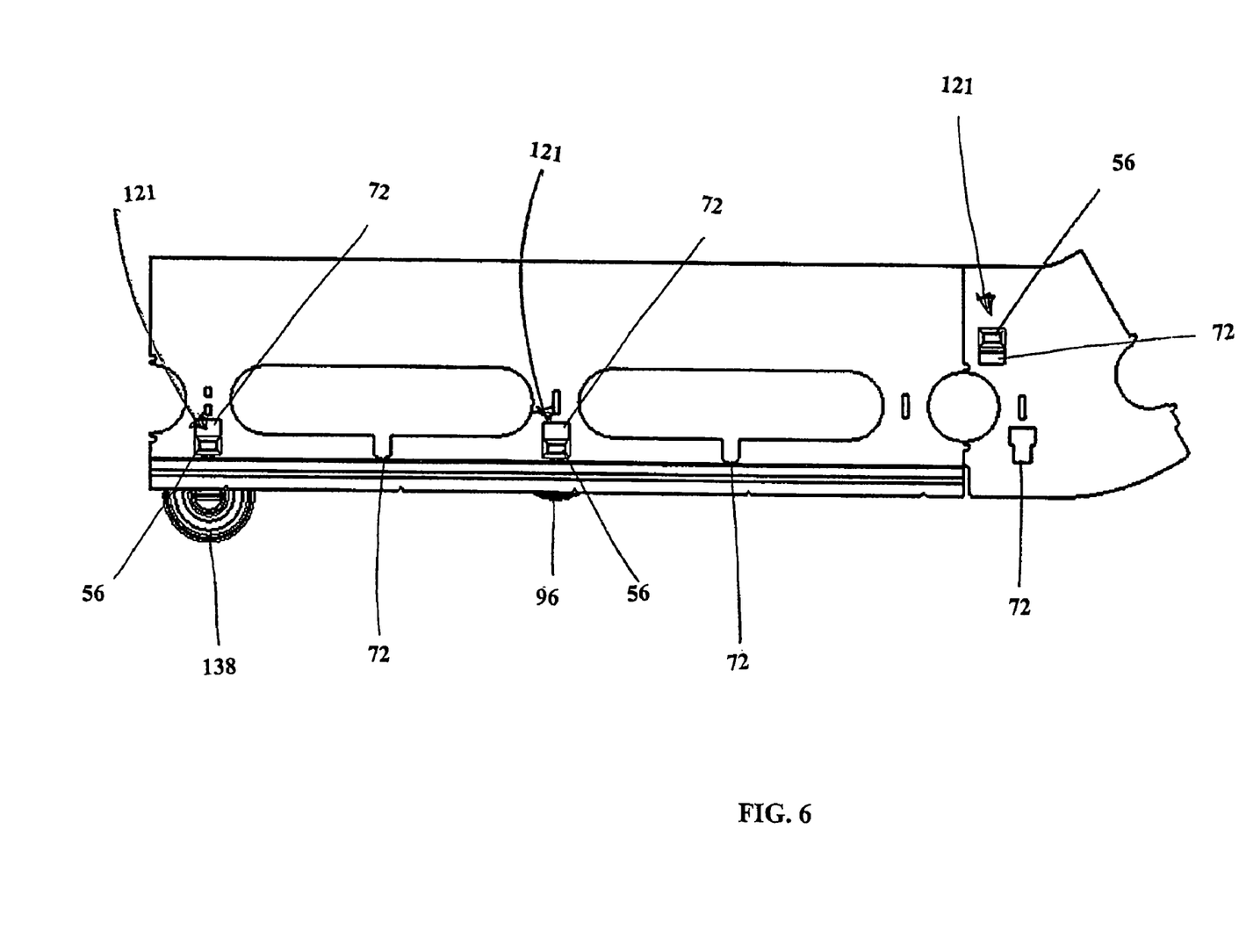
FIG. 6 is a side elevational view of one embodiment of the boltless conveyor assembly, showing the bracket and slot mechanism of FIGS. 4-5.

The bracket 56 is engaged with the slot by inserting the head portion 57 through the first slot portion 74 and then applying a force in the direction of the second slot portion 76 to snap or insert the neck portion 58 of the bracket into the second slot portion (see FIG. 6). Once the bracket 56, and in particular the head portion 57 of bracket 56, has been inserted into the slot 72 or 75, the head portion 57 of the bracket will stick out of the slot 72, and the neck portion 58 will fit snugly in the slot (see FIG. 8). Moreover, as discussed, in the preferred embodiment, the width of second slot portion 76 is equal to or slightly smaller than the width of neck portion 58 so that neck portion 58 can be held snugly in place as the conveyor assembly operates, but slid into or out of second slot portion 76 with a slight amount of force in order to attach and detach components.

It should be appreciated that slot 72, head portion 57, and neck portion 58 are of a standard size such that any one conveyor component which includes a bracket can attach to any other conveyor component which includes a slot. In this way, components can be easily moved to different slots or replaced and the design of the conveyor is easily modified. In addition, it is to be understood that the size of the first slot portion 74 may vary as long as it comprises dimensions which are sufficient to allow the head portion 57 of the bracket to pass through. For example, the structures of conventional conveyor assemblies have many openings or cut out portions. As can be seen in FIG. 4, in one embodiment, slot 75 has a slot portion 76 which is positioned adjacent or in contact with an aperture 77 in the rail, such as a clean out aperture. These apertures or cut out portions can be modified to also include slot portion 76, and thus function as a bracket receiving slot comprising a first slot portion 77 and a second slot portion 76. The alternative slots 72, 75 provided in a rail 134 or frame permit various arrangements of conveyor components.

Figures 5, 5A:
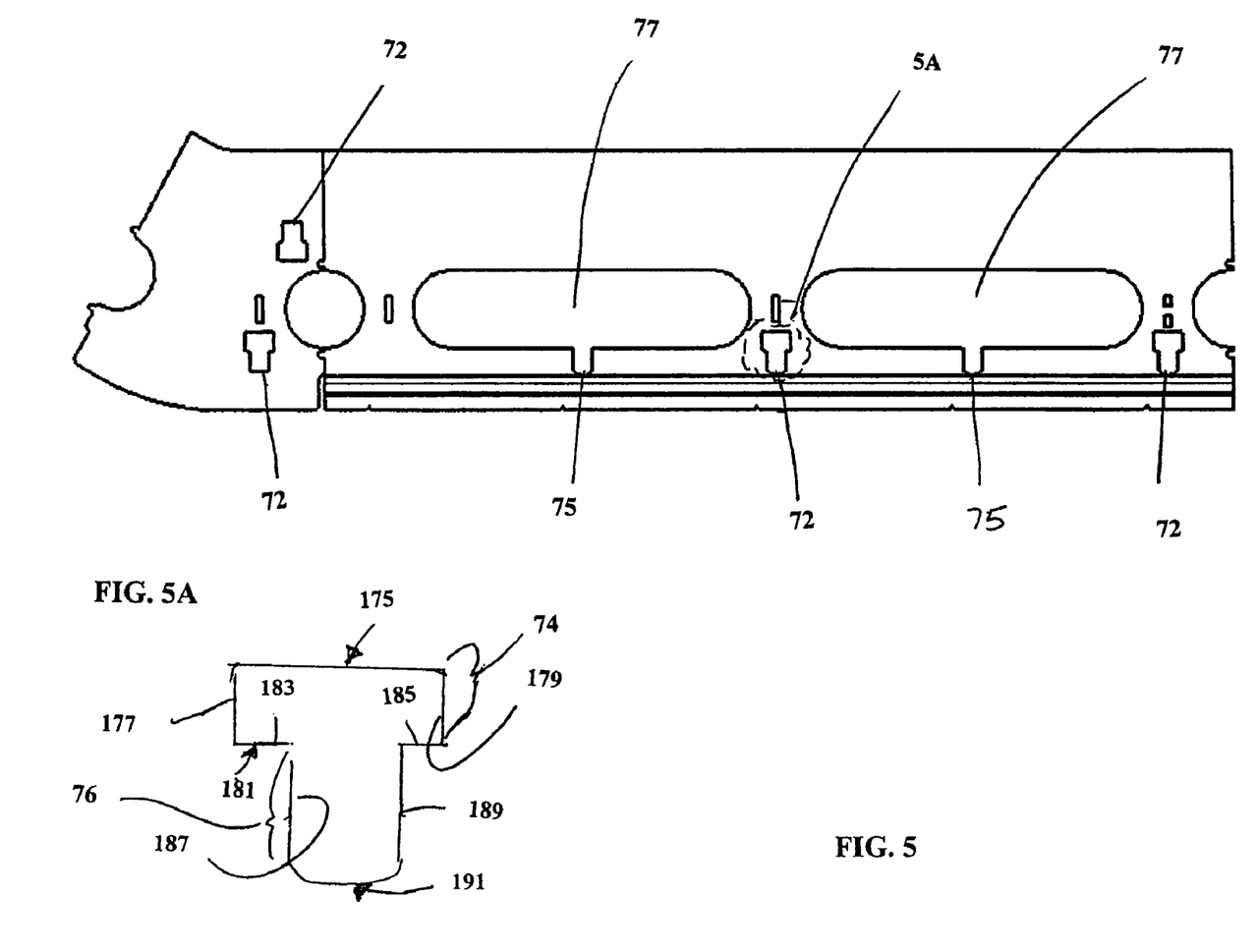
FIG. 5 is a side elevational view of one embodiment of a longitudinal rail having a plurality of slots for use with the bracket and slot mechanism of the conveyor assembly of FIG. 4.
FIG. 5A is a side elevational view of a slot of FIG. 5, taken at line 5A of FIG. 5.
Figure 7:
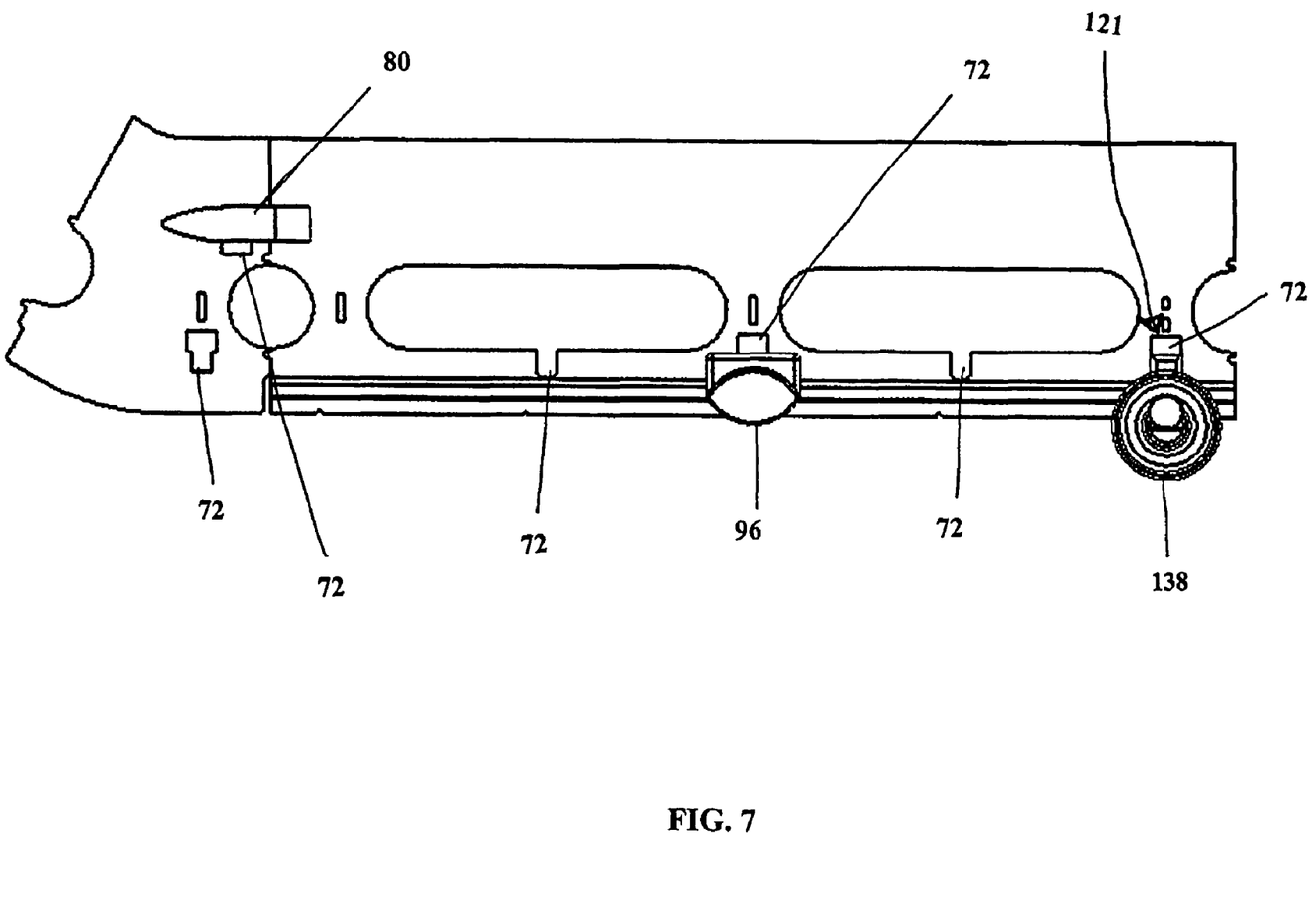
FIG. 7 is a side elevational view of the embodiment of the boltless conveyor assembly shown in FIG. 6 taken from the opposite side of that shown in FIG. 6.
Figure 8:
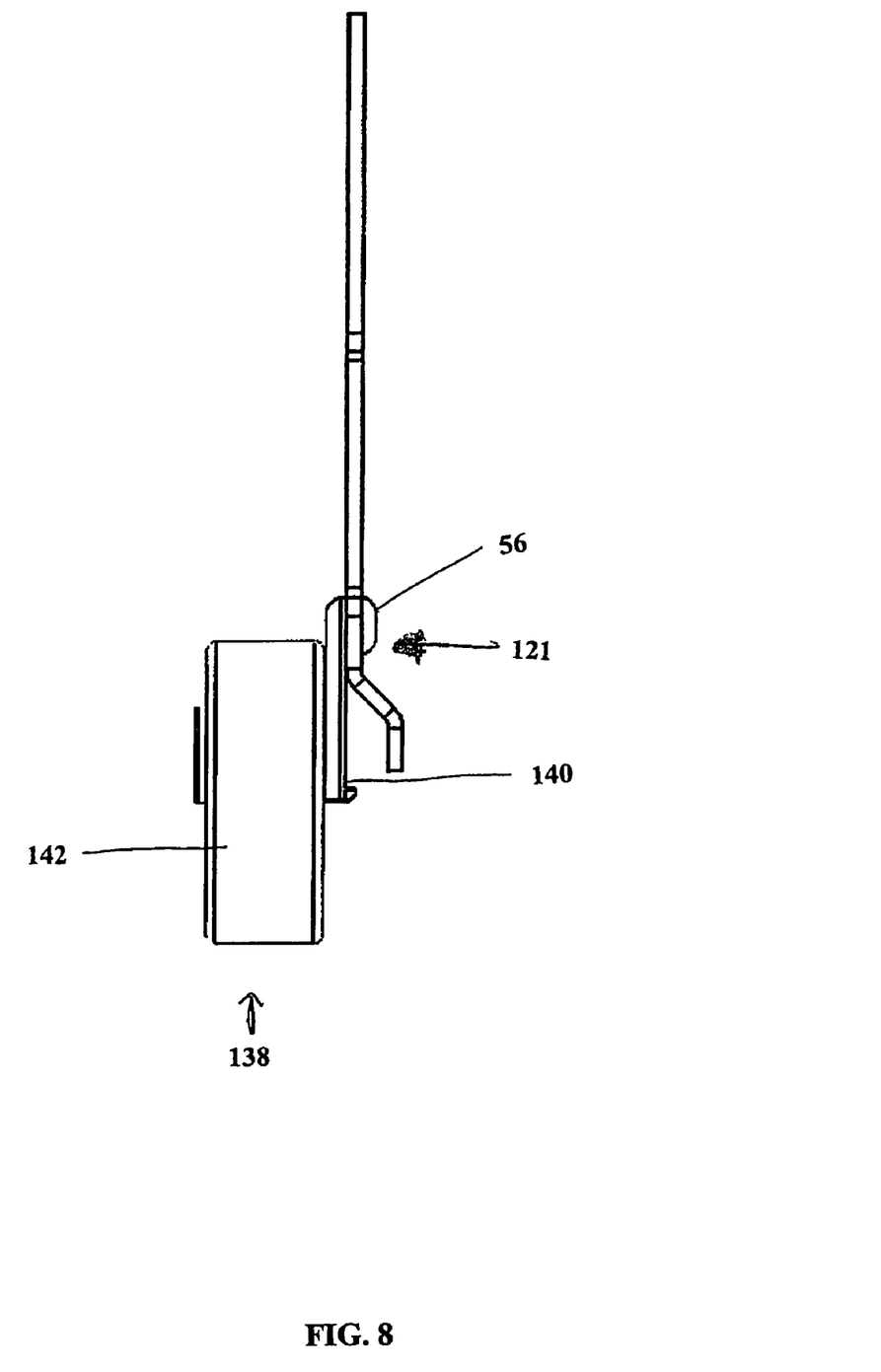
FIG. 8 is an end elevational view of the boltless conveyor assembly of FIG. 7.

FIGS. 5-7 illustrate a portion of a longitudinal rail 134 which comprises a plurality of slots 72, 75 for placement of conveyor components at various different points along the longitudinal rail 134. The longitudinal rail 134 illustrated has attached to it one hold down shoe 80, one return shoe 96, and one return wheel 138 for purposes of example and discussion. In the embodiment shown, there remain three slots 72 or 75 that are not attached to any component. It is appreciated, from viewing FIGS. 5-7, that another component can be added to the longitudinal rail 134 and attached to one of these open slots or one of the attached components may be moved.

Figure 9:
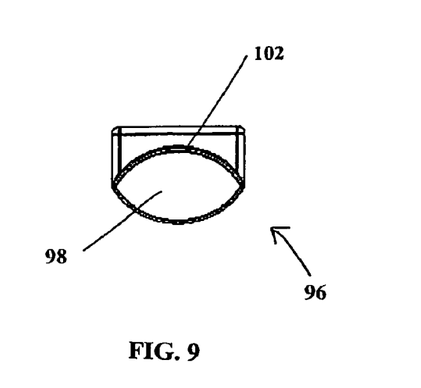
FIG. 9 is a side elevational view of a return shoe for use with an embodiment of the boltless conveyor assembly, and shown attached in FIG. 7.
Figure 10:
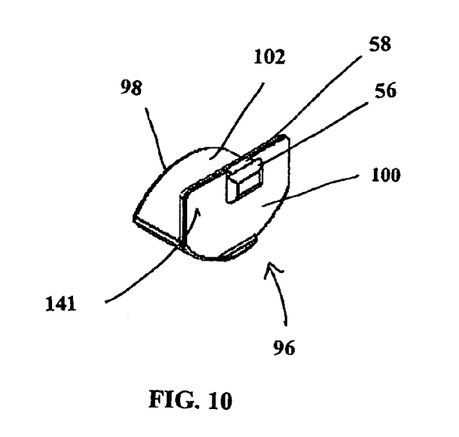
FIG. 10 is a perspective view of the return shoe of FIG. 9.
Figure 11:
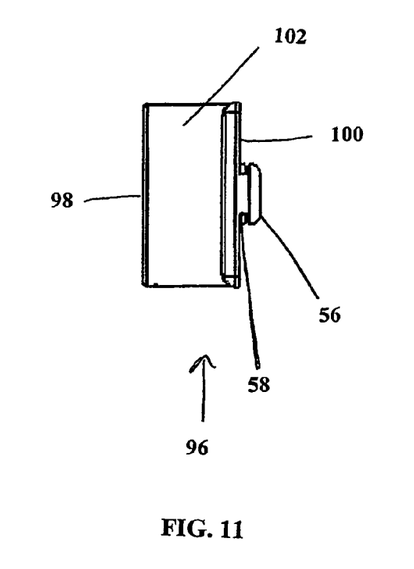
FIG. 11 is a top plan view of the return shoe of FIGS. 9-10.

As indicated, one or more return shoes 96 are preferably attached to the longitudinal rail 134. The return shoes are used to minimize the maximum sag of the conveyor belt 92 in the return portion of its traverse of the conveyor frame 112, to maintain tension in the conveyor belt 92, and to assist in guiding the conveyor belt 92 in its traverse. FIGS. 9-11 show an enlarged view of a return shoe 96 of one preferred embodiment for use with the bracket and slot mechanism. The return shoe generally comprises a body 102 that extends from a first face 98 to a second face 100. In the preferred embodiment, the body 102 of the return shoe 96 is convex in shape as this shape provides maximum support and few hard edges for the conveyor belt 92 as it rides along the body 102 of the return shoe 96. In addition, the second face 100 of the return shoe 96 comprises a means for attaching the return shoe 96 to the longitudinal rail 134. Specifically, the second face 100 carries bracket 56 and/or spacer 141 attached to the bracket to attach the return shoe to the longitudinal rail.

Figure 12:
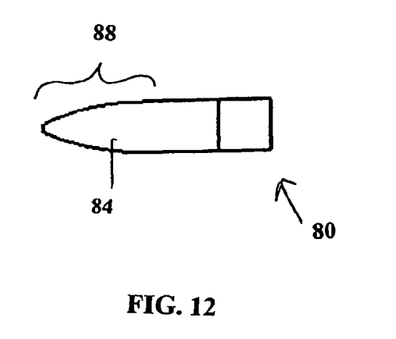
FIG. 12 is a side elevational view of a hold down shoes for use with an embodiment of the boltless conveyor assembly, and shown attached in FIG. 7.
Figure 13:
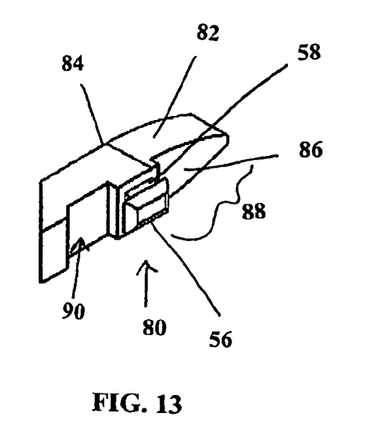
FIG. 13 is a perspective view of the hold down shoe of FIG. 12.
Figure 14:
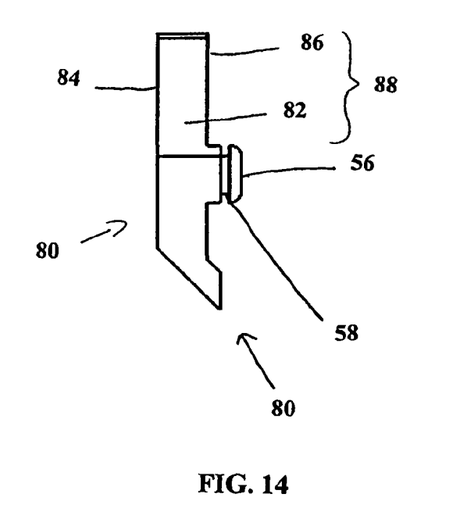
FIG. 14 is a top plan view of the hold down shoe of FIGS. 12-13.
Figure 15:
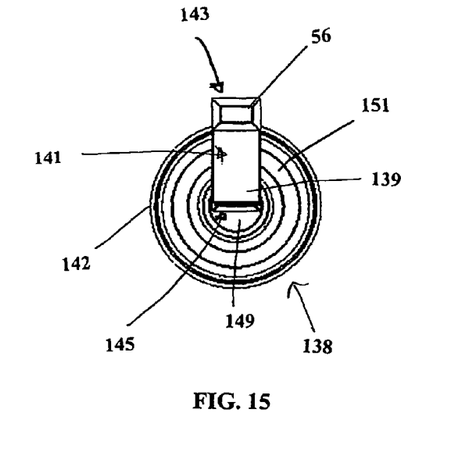
FIG. 15 is a side elevational view of a return wheel assembly for use with an embodiment of the boltless conveyor assembly, and shown attached in FIGS. 6-8.
Figure 16:
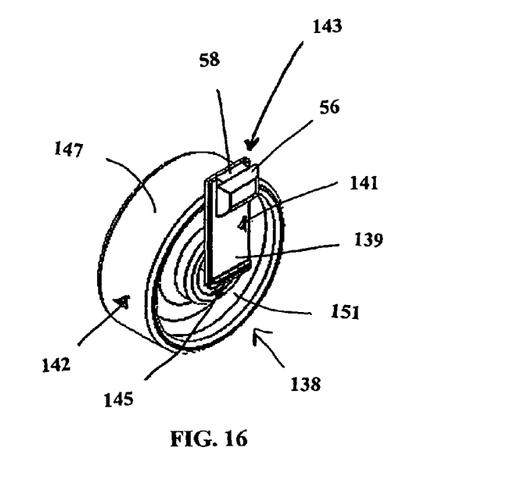
FIG. 16 is a perspective view of the hold down shoe of FIG. 15.

Conveyor assembly 110 may also have an incline portion 120 which is used to move items in a vertical or inclined or declined direction, as illustrated in FIG. 1. Namely, as the conveyor belt 92 transitions from the horizontal portion or carryway 119 to an incline portion 120 or carryway, the conveyor belt 92 will naturally attempt to travel in a straight line, and thus, lift from the wear bars and separate from the conveyor frame. Therefore, hold down shoes 80 are provided to hold the conveyor belt 92 down as it transitions from the horizontal portion to the incline portion 120. The hold down shoes 80 are attached to the longitudinal rail 134. One or more hold down shoes 80 may be used with the conveyor assembly 100. As can be seen in FIG. 1, the hold down shoe 80 is attached to the longitudinal rail 134 at the point immediately before the conveyor belt 92 begins to traverse the incline portion 120 of the conveyor assembly 110. FIGS. 12-14 show an enlarged view of a hold down shoe 80 from various different perspectives. The hold down shoe 80 has a body 82 which extends between a first side 84 and a side face 86. In the preferred embodiment, the body 82 of the hold down shoe 80 comprises at least one curved portion 88 which allows the conveyor belt 92 to follow the gradual curvature of the incline. In addition, similar to the return shoe, the second side 86 of the hold down shoe 80 is attached to bracket 56 and/or a spacer may be provided attached to the bracket for attaching the hold down shoe 80 to the longitudinal rail 134 using the bracket and slot attachment mechanism of the present invention. The body 82 of the hold down shoe 80 also comprises a notched out portion 90. The notched portion 90 may be provided for washing between the body 82 and the rail 134 to reduce or eliminate lamination of material.

Figure 17:
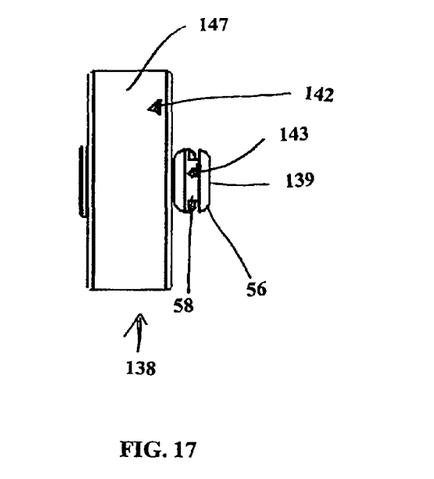
FIG. 17 is a top plan view of the hold down shoe of FIGS. 15-16.
Figure 18:
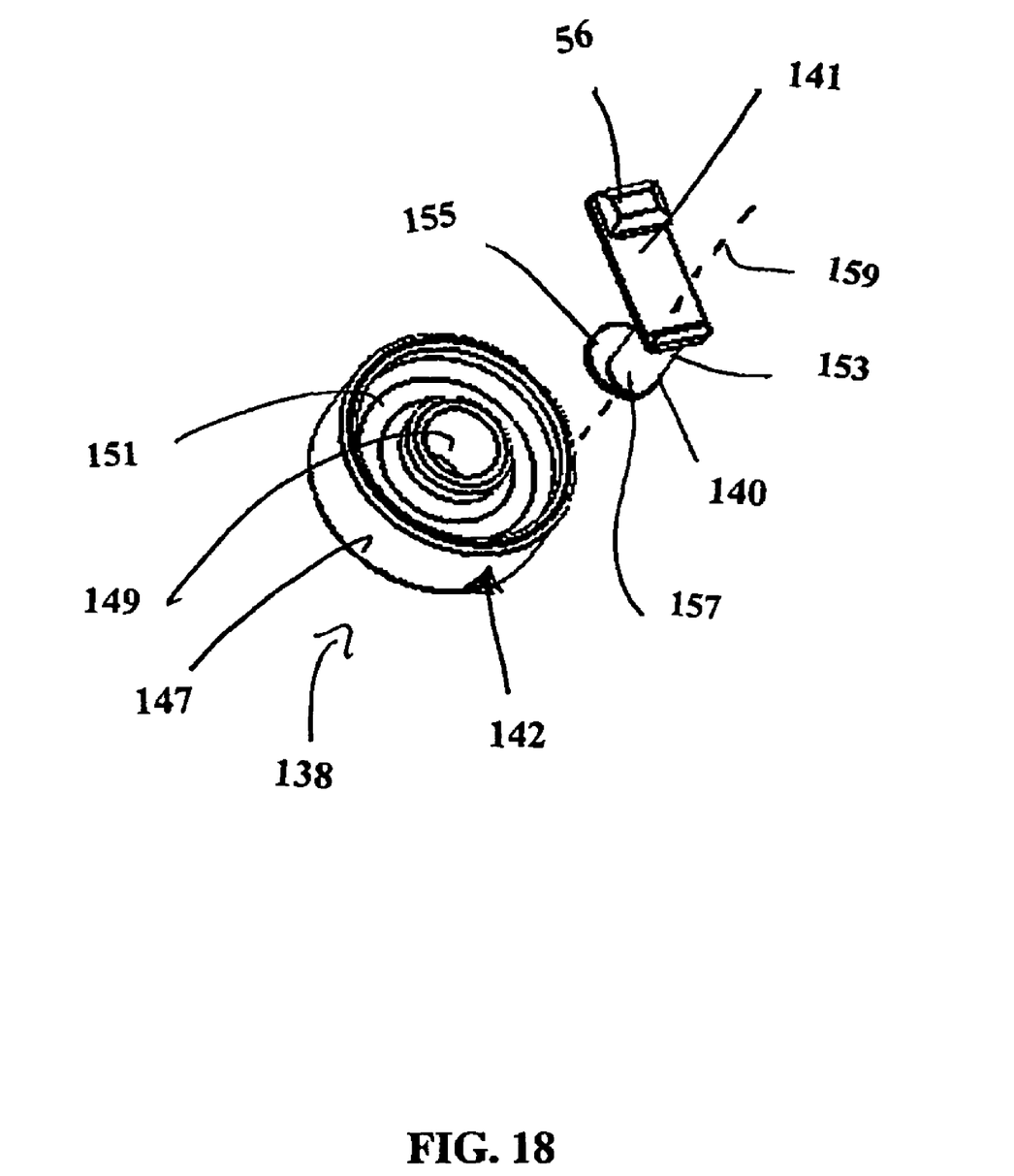
FIG. 18 is an exploded perspective view of the return wheel assembly of FIG. 16.

Also attached to the longitudinal rail 134 are return wheels 138. The return wheels 138 are used much in the same way as the return shoes, to minimize the maximum sag of the conveyor belt 92 in the return portion of its traverse of the conveyor frame 112, to maintain tension in the conveyor belt 92, and to assist in guiding the conveyor belt 92 in its traverse FIGS. 15-18 show an enlarged view of a return wheel 138 and return wheel support from various different perspectives. The return wheel support 139 is attached to spacer 141 carrying the bracket 56 on a first end 143 and the axle 140 on a second end 145. Return wheel 142 has an outer surface 147 for engagement with the belt 92 and an aperture 149 through a central portion 151 of the wheel. The axle 140 is attached to the spacer at the axle's first end 153 and carries a retention device 155 at its second end 157. The retention device 155 of the embodiment shown is a flat, circular disc positioned off-center from the central axis 159 of the axle 140. As can be seen in FIGS. 17-18, the wheel 142 spins on the axle 140.

In addition to the components discussed above, various other components may be attached to the longitudinal rail 134, including, but not limited to, vertical supports 132, cross members 150, a power drive motor and so forth. For instance, a fastenerless bearing housing, may be attached to the longitudinal rail 134 to retail a bearing in the rail without fasteners. An exemplary bearing assembly is shown in U.S. patent application Ser. No. 11/379,438 which is hereby incorporated by reference in its entirety herein. Moreover, various other components in the conveyor assembly may be attached to one another without the need for fasteners. For example, wear strips may be attached to the conveyor assembly without fasteners as indicated in U.S. patent application Ser. No. 11/194,378 which is hereby incorporated by reference in its entirety herein. Likewise, adjustable feet 136 may be attached to the lower end of the vertical supports 132 without fasteners.

Although the invention is particularly described herein with reference to a bracket and slot attachment means which is used to attach the above described components (i.e. the return wheel, the return shoe, and the hold down shoe) to the longitudinal rail, this is by way of example only, and one of ordinary skill would understand that such an attachment means could be used to attach various other components to the longitudinal rails, and to attach various other conveyor components to one another. For example, a first longitudinal rail may be attached to a second longitudinal rail using a bracket and slot mechanism.

In one preferred embodiment of a method for assembling a conveyor assembly 110, assembly 110 does not include the use of welding, clamps, or threaded fasteners. Specifically, a slot 72 is provided on a first conveyor component. The slot 72 includes a first slot portion 74 and a second slot potion 76 wherein the first slot portion 74 is wider than the second slot portion 76. In the illustrated embodiment, this first conveyor component is longitudinal rail 134, but it is understood that this first conveyor component could be any of a number of components used in making up a conveyor system. In addition, a bracket 56 comprising a head portion 57 and a neck portion 58 is provided on a second conveyor component. In the illustrated embodiment, this second conveyor component is return wheel 138, but it is understood that this second conveyor component could be any number of components used in making up a conveyor system.

In order to attach the first component to the second component, the bracket 56 on the second component is engaged with the slot 72 on the first component. Specifically, the head portion 57 of the bracket is pushed through the first slot portion 74. Once the head portion 57 of the bracket 56 is pushed through the first slot portion 74, the neck portion 58 of the bracket is aligned with the second slot portion 76 such that a force can be applied to the bracket in the direction of the second slot portion 76 (a downward force in the illustrated embodiment shown in the Figures) in order to secure or snap the neck portion 58 of the bracket into the second slot portion 76. Thus, the return wheel 138 is attached to the longitudinal rail 134 by first sliding the head portion 57 through first slot portion 74 and then pushing down on the bracket to insert neck portion 58 into second slot portion 76. The pieces may be held in place by the frictional engagement between the bracket and the slot.

In order to detach the first component from the second component, the process is reversed. Specifically, a force in the direction away from the second slot portion 76 (an upward force in the illustrated embodiment shown in the Figures) is applied to the bracket. Such a force will disengage the neck portion 58 from the second slot portion 76. The head portion 57 is then pulled through the first slot portion 74. Thus, the return wheel 138 is detached from the longitudinal rail 134 by first pushing up on the bracket 56 and then pulling head portion 57 through first slot portion 74.

As described herein, the present invention discloses a conveyor system and method of assembling same in which parts are fastened without the use of welding or threaded fasteners such as bolts and screws. The bracket and slot mechanism and method described provides various advantages over currently available systems. Attaching and detaching components merely requires sliding the bracket of one component into, or out of, the slot of the other component, thus making assembly/disassembly of conveyor components easy. For example, a return wheel on a conveyor assembly can be moved from one position on the assembly to another by merely detaching the return wheel through sliding its bracket out of one slot and then reattaching the return wheel in another position by sliding its bracket into a different slot. Modifications to the conveyor assembly can also be made easily without the need for redesign or fabrication. Furthermore, the bracket and slot can also be comprised of a shape which provides minimal surface area for the collection of water, bacteria, mold, food waste, and other unwanted materials. Moreover, the brackets and slots can be of a standardized size and shape and provided for any conveyor component such that standard replacement components can be provided for replacing broken components.

Presently preferred embodiments of the invention and many of its improvements have been described with a degree of particularity. The previous description is of preferred examples for implementing the invention, and the scope of the invention should not necessarily be limited by this description. Although various representative embodiments of this invention have been described above with a certain degree of particularity, those skilled in the art could make numerous alterations to the disclosed embodiments without departing from the spirit or scope of the inventive subject matter set forth in the specification and claims. All directional references (e.g., upper, lower, upward, downward, left, right, leftward, rightward, top, bottom, above, below, vertical, horizontal, angled, and so forth) are only used for identification purposes to aid the reader's understanding of the embodiments of the present invention, and do not create limitations, particularly as to the position, orientation, or use of the invention unless specifically set forth in the claims. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

The invention claimed is:

1. A conveyor assembly comprising:
a first conveyor component comprising a bracket and a return wheel assembly;
a second conveyor component comprising a slot for mating engagement with the bracket; and
wherein said second conveyor component is attached to said first conveyor component by engaging said bracket with said slot to achieve a snug fit.

2. The conveyor assembly of claim 1 wherein said slot comprises a first slot section and a second slot section, and wherein said first slot section is wider than said second slot section.

3. The conveyor assembly of claim 2 wherein said bracket comprises a head portion and a neck portion, and wherein said head portion is wider than said neck portion such that said first conveyor component is attached to said second conveyor component by inserting said head portion through said first slot section and then applying a force to insert said neck portion into said second slot section to achieve a snug fit.

4. The conveyor assembly of claim 1, wherein the second conveyor component is a longitudinal rail.

5. The conveyor assembly of claim 1 wherein said return wheel assembly comprises a return wheel support axle attached to a return wheel.

6. A conveyor assembly comprising:
a first conveyor component comprising a bracket and a return shoe;
a second conveyor component comprising a slot for mating engagement with the bracket: and
wherein said second conveyor component is attached to said first conveyor component by engaging said bracket with said slot to achieve a snug fit.

7. The conveyor assembly of claim 6, wherein the second conveyor component is a longitudinal rail.

8. The conveyor assembly of claim 6 wherein said slot comprises a first slot section and a second slot section, and wherein said first slot section is wider than said second slot section.

9. The conveyor assembly of claim 8 wherein said bracket comprises a head portion and a neck portion, and wherein said head portion is wider than said neck portion such that said first conveyor component is attached to said second conveyor component by inserting said head portion through said first slot section and then applying a force to insert said neck portion into said second slot section to achieve a snug fit.

10. A conveyor assembly comprising:
a first conveyor component comprising a bracket and a hold down shoe;
a second conveyor component comprising a slot for mating engagement with the bracket; and
wherein said second conveyor component is attached to said first conveyor component by engaging said bracket with said slot to achieve a snug fit.

11. The conveyor assembly of claim 10, wherein the second conveyor component is a longitudinal rail.

12. The conveyor assembly of claim 10 wherein said slot comprises a first slot section and a second slot section, and wherein said first slot section is wider than said second slot section.

13. The conveyor assembly of claim 12 wherein said bracket comprises a head portion and a neck portion, and wherein said head portion is wider than said neck portion such that said first conveyor component is attached to said second conveyor component by inserting said head portion through said first slot section and then applying a force to insert said neck portion into said second slot section to achieve a snug fit.

14. A conveyor assembly comprising:
a plurality of first conveyor components wherein at least one of said first conveyor components comprises a plurality of slots for mating engagement with a bracket, and wherein at least one of the first conveyor components is a longitudinal rail;
a plurality of second conveyor components wherein each of said second conveyor components comprises a bracket for mating engagement with one of said slots; and
wherein said at least one second conveyor component having said bracket is attached to one of said first conveyor components by engaging said bracket with one of said slots to achieve a snug fit.

15. The conveyor assembly of claim 14 wherein said slots are spaced an equal distance apart.

16. A conveyor assembly comprising:
a plurality of first conveyor components wherein at least one of said first conveyor components comprises a plurality of slots for mating engagement with a bracket;
a plurality of second conveyor components wherein each of said second conveyor components comprises a bracket for mating engagement with one of said slots and wherein at least one of the second conveyor components further comprises a return wheel assembly; and
wherein said at least one second conveyor component having said bracket is attached to one of said first conveyor components by engaging said bracket with one of said slots to achieve a snug fit.

17. A conveyor assembly comprising:
a plurality of first conveyor components wherein at least one of said first conveyor components comprises a plurality of slots for mating engagement with a bracket;
a plurality of second conveyor components wherein each of said second conveyor components comprises a bracket for mating engagement with one of said slots and wherein at least one of said second conveyor components further comprises a return shoe; and
wherein said at least one second conveyor component having said bracket is attached to one of said first conveyor components by engaging said bracket with one of said slots to achieve a snug fit.

18. A conveyor assembly comprising:

a plurality of first conveyor components wherein at least one of said first conveyor components comprises a plurality of slots for mating engagement with a bracket;

a plurality of second conveyor components wherein each of said second conveyor components comprises a bracket for mating engagement with one of said slots and wherein at least one of said second conveyor components further comprises a hold down shoe; and wherein said at least one second conveyor component having said bracket is attached to one of said first conveyor components by engaging said bracket with one of said slots to achieve a snug fit.

\* \* \* \* \*

UNITED STATES PATENT AND TRADEMARK OFFICE
CERTIFICATE OF CORRECTION

PATENT NO. : 8,074,793 B2  
APPLICATION NO. : 12/163237  
DATED : December 13, 2011  
INVENTOR(S) : Jager Page 1 of 1

It is certified that error appears in the above-identified patent and that said Letters Patent is hereby corrected as shown below:

In the Specification

In Column 6, Line 23, delete "first slot portion 77" and insert -- first slot portion 74 --, therefor.

In the Claims

In Column 9, Line 51, in Claim 6, delete "bracket: and" and insert -- bracket; and --, therefor.

Signed and Sealed this  
First Day of October, 2013

Teresa Stanek Rea  
*Deputy Director of the United States Patent and Trademark Office*